United States Patent [19]
Matsuki

[11] Patent Number: 5,884,603
[45] Date of Patent: Mar. 23, 1999

[54] TORQUE DOWN CONTROL APPARATUS FOR AN ENGINE

[75] Inventor: Yoshitaka Matsuki, Kanagawa-ken, Japan

[73] Assignee: Nissan Motor Co., Ltd., Kanagawa-ken, Japan

[21] Appl. No.: 937,584

[22] Filed: Sep. 29, 1997

[30] Foreign Application Priority Data

Sep. 30, 1996 [JP] Japan ................................ 8-259724

[51] Int. Cl.⁶ ........................................ B60K 28/16
[52] U.S. Cl. ............... 123/333; 123/481; 123/198 F; 180/197; 701/86
[58] Field of Search ............. 123/481, 198 F, 123/332–335; 180/197; 701/86

[56] References Cited

U.S. PATENT DOCUMENTS

| | | | |
|---|---|---|---|
| 4,146,006 | 3/1979 | Garabedian. | |
| 5,012,882 | 5/1991 | Oono et al. . | |
| 5,025,881 | 6/1991 | Poirier et al. | 123/332 |
| 5,099,942 | 3/1992 | Kushi et al. | 123/333 |
| 5,287,279 | 2/1994 | Anan | 123/333 |
| 5,463,551 | 10/1995 | Milunas | 123/417 |
| 5,473,544 | 12/1995 | Yamashita | 123/416 |
| 5,559,703 | 9/1996 | Iwata et al. | 123/481 |
| 5,630,480 | 5/1997 | Nishikata | 180/197 |

FOREIGN PATENT DOCUMENTS

| | | | |
|---|---|---|---|
| 58-117328 | 7/1983 | Japan | 123/481 |
| 3-246334 | 11/1991 | Japan . | |
| 1508906 | 6/1975 | United Kingdom . | |
| 2092777 | 1/1982 | United Kingdom . | |
| 2 200 478 | 7/1988 | United Kingdom | 123/481 |
| 2206156 | 12/1988 | United Kingdom . | |
| 9720801.1 | 12/1997 | United Kingdom . | |
| 94/11627 | 5/1994 | WIPO | 123/481 |

*Primary Examiner*—Erick R. Solis
*Attorney, Agent, or Firm*—McDermott, Will & Emery

[57] ABSTRACT

In a V type engine comprising a catalyst in each of banks, when a fuel cut requirement on the basis of a traction control is generated, cylinders in which the fuel is cut are controlled to be switched between right and left banks. For example, when a requirement for a fuel cut with respect to two cylinders, at first, after the fuel cut of two cylinders are performed in the right bank for a predetermined time, the fuel cut of two cylinder are performed in the left bank for a predetermined time and this operation is repeated during a continuing time of the fuel cut. Accordingly, a thermal damage due to the fuel cut can be prevented from concentrating only to one catalyst.

9 Claims, 11 Drawing Sheets

FUEL CUT CYLINDER PATTERN

| | | PHASE MODE | | | | | |
|---|---|---|---|---|---|---|---|
| | | 1 | 2 | 3 | 4 | 5 | 6 |
| REQUIRED NUMBER OF CYLINDERS | 1 | # 1 | # 2 | # 3 | # 4 | # 5 | # 6 |
| | 2 | # 1,3 | # 2,4 | # 3,5 | # 4,6 | # 1,5 | # 2,6 |
| | 3 | # 1,3,5 | # 2,4,6 | # 1,3,5 | # 2,4,6 | # 1,3,5 | # 2,4,6 |
| | 4 | # 1,3,5,2 | # 2,4,6,1 | # 1,3,5,4 | # 2,4,6,3 | # 1,3,5,6 | # 2,4,6,5 |
| | 5 | # 1,3,5,2,4 | # 2,4,6,1,3 | # 1,3,5,4,6 | # 2,4,6,3,5 | # 1,3,5,2,6 | # 2,4,6,1,5 |
| | 6 | # 1 - 6 | # 1 - 6 | # 1 - 6 | # 1 - 6 | # 1 - 6 | # 1 - 6 |

FIG.5

| REQUIRED NUMBER OF CYLINDER | FUEL CUT CYLINDER PATTERN | |
| --- | --- | --- |
| | A MODE | B MODE |
| 1 | ○ ● #1<br>○ ○<br>○ ○ | #2 ● ○<br>○ ○<br>○ ○ |
| 2 | ○ ● #1<br>○ ● #3<br>○ ○ | #2 ● ○<br>#4 ● ○<br>○ ○ |
| 3 | ○ ● #1<br>○ ● #3<br>○ ● #5 | #2 ● ○<br>#4 ● ○<br>#6 ● ○ |
| 4 | #2 ● ● #1<br>#4 ● ○<br>#6 ● ○ | #2 ● ● #1<br>○ ● #3<br>○ ● #5 |
| 5 | ○ ● #1<br>#4 ● ● #3<br>#6 ● ● #5 | #2 ● ○<br>#4 ● ● #3<br>#6 ● ● #5 |
| 6 | ALL CYLINDERS (SIX CYLINDERS) FUEL CUT | |

● ······ FUEL CUT
○ ······ FUEL INJECT

FIG.8

FUEL CUT CYLINDER PATTERN

| | | PHASE MODE | | | | | |
|---|---|---|---|---|---|---|---|
| | | 1 | 2 | 3 | 4 | 5 | 6 |
| REQUIRED NUMBER OF CYLINDERS | 1 | # 1 | # 2 | # 3 | # 4 | # 5 | # 6 |
| | 2 | # 1,3 | # 2,4 | # 3,5 | # 4,6 | # 1,5 | # 2,6 |
| | 3 | # 1,3,5 | # 2,4,6 | # 1,3,5 | # 2,4,6 | # 1,3,5 | # 2,4,6 |
| | 4 | # 1,3,5,2 | # 2,4,6,1 | # 1,3,5,4 | # 2,4,6,3 | # 1,3,5,6 | # 2,4,6,5 |
| | 5 | # 1,3,5,2,4 | # 2,4,6,1,3 | # 1,3,5,4,6 | # 2,4,6,3,5 | # 1,3,5,2,6 | # 2,4,6,1,5 |
| | 6 | # 1 - 6 | # 1 - 6 | # 1 - 6 | # 1 - 6 | # 1 - 6 | # 1 - 6 |

TORQUE DOWN CONTROL APPARATUS FOR AN ENGINE

The content of Application No. TOKUGANHEI 8-259724, filed Sep. 30, 1996, in Japan is hereby incorporated by reference.

BACKGROUND OF THE INVENTION

The present invention relates to a torque down control apparatus for an engine, more particularly to a technology which reduces an amount of fuel injection from an injector to a cylinder so as to temporally lower an output torque of an engine.

Conventionally, a traction control system (hereinafter, referred to as a TCS) for achieving a running stability of an automotive vehicle by forcibly reducing a drive torque of a drive wheel at a time of slippage of the automotive vehicle is known.

Methods for forcibly reducing a drive torque of a drive wheel include a method for reducing an output torque of an engine by cutting a fuel supply to the engine (refer to Japanese Patent Unexamined Publication No. 3-246334).

In the above TCS, in order to avoid generation of a shock and to change smoothly a drive torque of a drive wheel in accordance with a state of a slippage, it is desirable to change a number of cylinders into which the fuel supply is cut at every one cylinder.

The above method can be applied to a V type engine in which an exhaust manifold is provided at every cylinder in the right and left banks and an independent catalyst for each of the banks is provided at a gathering portion of each of the exhaust manifolds. In this case, it is desirable to change the number of cylinders into which the fuel supply is cut one by one.

SUMMARY OF THE INVENTION

However, in the V type engine, for example, when a required number of cylinders is one, if the fuel supply to a predetermined cylinder is continuously cut for a long time, there occurs a phenomenon that an air discharged from the cylinder is burnt in an exhaust manifold and/or an exhaust pipe (hereinafter, what is called an after burning) so that there is a risk that a temperature of the catalyst in one bank to which the cylinder belongs becomes higher than that of the catalyst in the other bank, thereby greatly advancing a thermal deterioration. In order to prevent generation of such an unbalance of the thermal deterioration between the catalysts, a period of duration for cutting the fuel is limited. Accordingly, there is a road condition in which it is difficult to achieve both improvement of the running stability of the automotive vehicle by the TCS and prevention of generation of the unbalance of the thermal deterioration between the catalysts.

The present invention is achieved by taking the above problems into consideration and an object of the invention is to provide a torque down control apparatus capable of cutting a fuel for a sufficient time while preventing a thermal damage of a catalyst in an engine in which an exclusive catalyst is provided at a plurality of cylinder groups.

In order to achieve the above object, a torque down control apparatus in accordance with the present invention is provided with a plurality of cylinder groups and a controller as mentioned below. Each of the cylinder groups includes cylinders, injectors respectively corresponding to the cylinders and supplying fuel to the cylinders, and an exhaust system having a catalyst. The controller operates one or more injectors so as to reduce a fuel supply amount into the corresponding cylinder and further switches the injector to be operated so that a total reduction amount of the fuel supply in each of the cylinder groups changes with time.

For example, in the case of a V type engine in which an exhaust manifold is provided at every right and left bank and a catalyst is respectively provided at a gathering portion of each of the exhaust manifolds, the left bank group and the right bank group respectively correspond to the above cylinder groups. In this case, the discharge gas from the right and left banks may be gathered at a downstream position of the catalyst.

On the contrary, in the case of an straight engine, if it is structured such that all cylinders is divided into a plurality of groups, that an exhaust manifold is provided at every group and that a catalyst is provided at a gathering portion of each of the exhaust manifolds, the above divided groups respectively correspond to the above cylinder groups.

The controller may be structured such as to switch the injector to be operated at every predetermined time period.

The controller may be structured such as to stop a fuel injection from the injector so that the fuel supply to the cylinder is cut.

The controller may be structured such as to receive a torque down requirement signal which indicates a torque down amount to be required and to determine a total number of cylinders (a required number of cylinders) in which a fuel cut is required on the basis of the torque down requirement signal so as to stop a fuel injection from the injectors which correspond to the number of the determined required number of cylinders.

In accordance with each of the above structures, since the injector is switched such that the total reduction amount of the fuel supply in each of the cylinder groups changes with time, the total reduction amount of the fuel supply in each of the cylinder group does not become excessive continuously for a long time. Accordingly, an influence to the catalyst due to the reduction of the fuel supply amount is not concentrated to a special group but is dispersed into the respective cylinder groups. Therefore, the thermal deterioration of the catalyst can be prevented.

The controller may be structured such as to successively switch the injector stopping the fuel injection in accordance with a switching pattern of combination of cylinders which is set in a memory in response to the required number of cylinders.

For example, in the engine having six cylinders of No. 1 to No. 6, in the case that a first cylinder group including three cylinders of No. 1, No. 3 and No. 5 and a second cylinder group including three cylinders of No. 2, No. 4 and No. 6 are provided, a calculated required number of cylinders is two and the memory sets a pattern such that the cylinders of No. 1 and No. 3 and the cylinders of No. 2 and No. 4 are alternately selected in response to the required number of cylinders two, in accordance with the pattern, the fuel cut to the cylinders of No. 1 and No. 3 and the fuel cut to the cylinders of No. 2 and No. 4 are alternately performed.

In accordance with the above structure, the cylinder in which the fuel supply is cut can be switched in the most suitable pattern in correspondence to the number of cylinders in which the fuel cut is required so that a stable fuel cut can be achieved.

The controller may be structured such as to switch the injector to be operated, as the number of cylinders given to one cylinder group among the required number of cylinders is a predetermined number smaller than a total cylinder number included in the cylinder group, so as to change a combination of cylinders in which the fuel cut is performed among the above one cylinder group at every time when the above predetermined number is given to the above one cylinder group.

For example, in the engine having six cylinders of No. 1 to No. 6, in the case that a first cylinder group including three cylinders of No. 1, No. 3 and No. 5 and a second cylinder group including three cylinders of No. 2, No. 4 and No. 6 are provided, a calculated required number of cylinders is one (smaller than three) and this required number of cylinders one is alternately given to the first cylinder group and the second cylinder group, in the first cylinder group, the fuel supply to the cylinder No. 1 is not always cut but the fuel supply to the three cylinders of No. 1, No. 3 and No. 5 is successively cut such that firstly the fuel cut to the No. 1 cylinder, secondly the fuel cut to the No. 3 cylinder and thirdly the fuel cut to the No. 5 cylinder are performed at every time of switching from the second cylinder group. Similarly, in the second cylinder group, the fuel supply to the three cylinder of No. 2, No. 4 and No. 6 are successively cut at every time of switching from the first cylinder group. Further, the calculated required number of cylinders is two (smaller than three) and this required number of cylinders two is alternately given to the first cylinder group and the second cylinder group, in the first cylinder group, the fuel supply to two cylinders having different combination is successively cut such that firstly the fuel cut to the No. 1 and No. 3 cylinders, secondly the fuel cut to the No. 3 and No. 5 cylinders and thirdly the fuel cut to the No. 5 and No. 1 cylinders are performed at every time of switching from the second cylinder group.

In accordance with the above structure, the fuel supply is not cut only in a partly special cylinder among a plurality of cylinders which constitute the same cylinder group so that an influence due to the fuel cut (a change of temperature, a change of a wall stream in a port injection and the like) can be made uniform between the cylinders.

The plurality of cylinder groups may be two cylinder groups having the same number of cylinders, and the controller may be structured such as to operate the injectors included in one cylinder group so as to stop the fuel injection when the required number of cylinders is not more than the number of cylinders included in the cylinder group an to operate all the injectors included in the one cylinder group and the injectors of the number which is determined by subtracting the number of cylinders included in the cylinder group from the fuel required number of cylinders among the injectors included in the other cylinder group so as to stop the fuel injection when the required number of cylinders is more than the number of cylinders included in the cylinder group.

For example, in the engine having six cylinders of No. 1 to No. 6, in the case that a first cylinder group including three cylinders of No. 1, No. 3 and No. 5 and a second cylinder group including three cylinders of No. 2, No. 4 and No. 6 are provided, a calculated required number of cylinders is two (smaller than three), this required number of cylinders two is alternately given to the first cylinder group and the second cylinder group and only the fuel supply to two cylinders included in one cylinder group is cut. Further, in the case that the calculated required number of cylinders is four (larger than three), the required number of cylinders four is separated such as to give three to the one cylinder group and to give one to the other cylinder group and this separated numbers are alternately switched to each other. Accordingly, at first, the fuel supply to all the cylinders of No. 1, No. 3 and No. 5 of the first cylinder group and to one cylinder of the second cylinder group is cut and next, the fuel supply to one of the first cylinder group and to all of the cylinders of No. 2, No. 4 and No. 6 of the second cylinder group is cut. This fuel cut operation is repeated.

In accordance with the above structure, the cylinders in which the fuel is cut are concentrated to one cylinder group as much as possible and the cylinder group in which the fuel cut is concentrated is successively switched.

For example, in the case that the required number of cylinders for the fuel cut is three, when the required number of cylinders three is firstly divided into two to one group and one to the other group, next divided into one to the one group and two to the other group and this operation is repeated, the both cylinder groups are in a state of always performing a fuel cut so that the after burning is continuously generated. In comparison with this, in the above structure, the above required number of cylinder three is alternately given to the one and the other cylinder groups. Accordingly, at first only the fuel supply to three cylinders of the one cylinder group is cut, next only the fuel supply to three cylinders of the other cylinder group is cut and this operation is repeated. As a result of this, in both of the cylinder groups, the after burning is generated. Therefore, in comparison with the case in which the after burning is continuously generated, an increase of temperature in the catalyst is prevented.

Further, the required number of cylinders is more than the number of cylinders included in one cylinder group, there is a case that the fuel is performed in both the cylinder groups at the same time. However, even in this case, the cylinders in which the fuel is cut are concentrated to one cylinder group as much as possible and the cylinder group to which the fuel cut is concentrated is successively switched so that in comparison with the case the cylinders in which the fuel is cut is divided into two cylinder groups, the generation of the after burning becomes close to an intermittent state, thereby preventing increase of temperature in the catalyst.

As mentioned above, since the state in which the influence of the fuel cut is minimum alternately occurs in the respective cylinder groups, the increase of temperature in the catalyst can be prevented to the maximum.

The controller may be structured such as to immediately operate the injectors which correspond to the number of the required number of cylinders after changing and to switch the injectors to be operated after a predetermined time continuously measured before the change lapses when the required number of cylinders for the fuel cut is changed.

In accordance with the above structure, when the required number of cylinders is changed before the lapse of the predetermined time for switching the injectors, the injectors which correspond to the required number of cylinders after the change are immediately operated. On the contrary, the switching of the next injectors is performed at the predetermined timing previously set before the change with no relation to this change of the required number of cylinders and is not performed at a timing of a lapse of a predetermined time after the required number of cylinders is changed.

Accordingly, a response performance to the change of the torque down requirement can be better. Further, since the switching timing of the injector is not temporally delayed, it can be prevented that a time period for which the fuel cut effects one catalyst is unnecessarily long. The controller may be structured such as to change a predetermined time in response to a load of an engine and an engine speed.

In accordance with the above structure, the time for switching the injectors can be suitably set by taking the influence of the fuel cut which is changed by the engine load and the engine speed into consideration so that prevention of increase of a temperature in the catalyst can be stably performed.

The controller may be structured such as to switch the injectors to be operated when an accumulated cycle number of the engine reaches a predetermined number.

In accordance with the above structure, the injectors are switched at every time when the exhaust is performed at a predetermined number so that a total reduction amount of the fuel supply in each of the cylinder groups is changed. Accordingly, the influence due to the fuel cut is appropriately divided into each of the catalysts so that the prevention of the temperature increase in the catalyst can be stably performed.

The required amount of the torque down may be structured to be determined in accordance with a slip rate of a drive wheel of the automotive vehicle.

In accordance with the above structure, the fuel cut is performed on the basis of the requirement from the TCS and the case that the torque down is required relatively for a long time may occur in accordance with the road condition. However, even in this case, the torque down due to the fuel cut can be performed while preventing the influence due to the fuel cut.

BRIEF DESCRIPTION OF THE DRAWINGS

FIG. 5 is a view which shows cylinder patterns for a fuel cut in accordance with a first embodiment of the present invention;

FIG. 8 is a view which shows cylinder patterns for a fuel cut in accordance with a second embodiment of the present invention;

DESCRIPTION OF THE PREFERRED EMBODIMENTS

A first embodiment of the present invention will be explained below with reference to the accompanying drawings.

Figure 1:
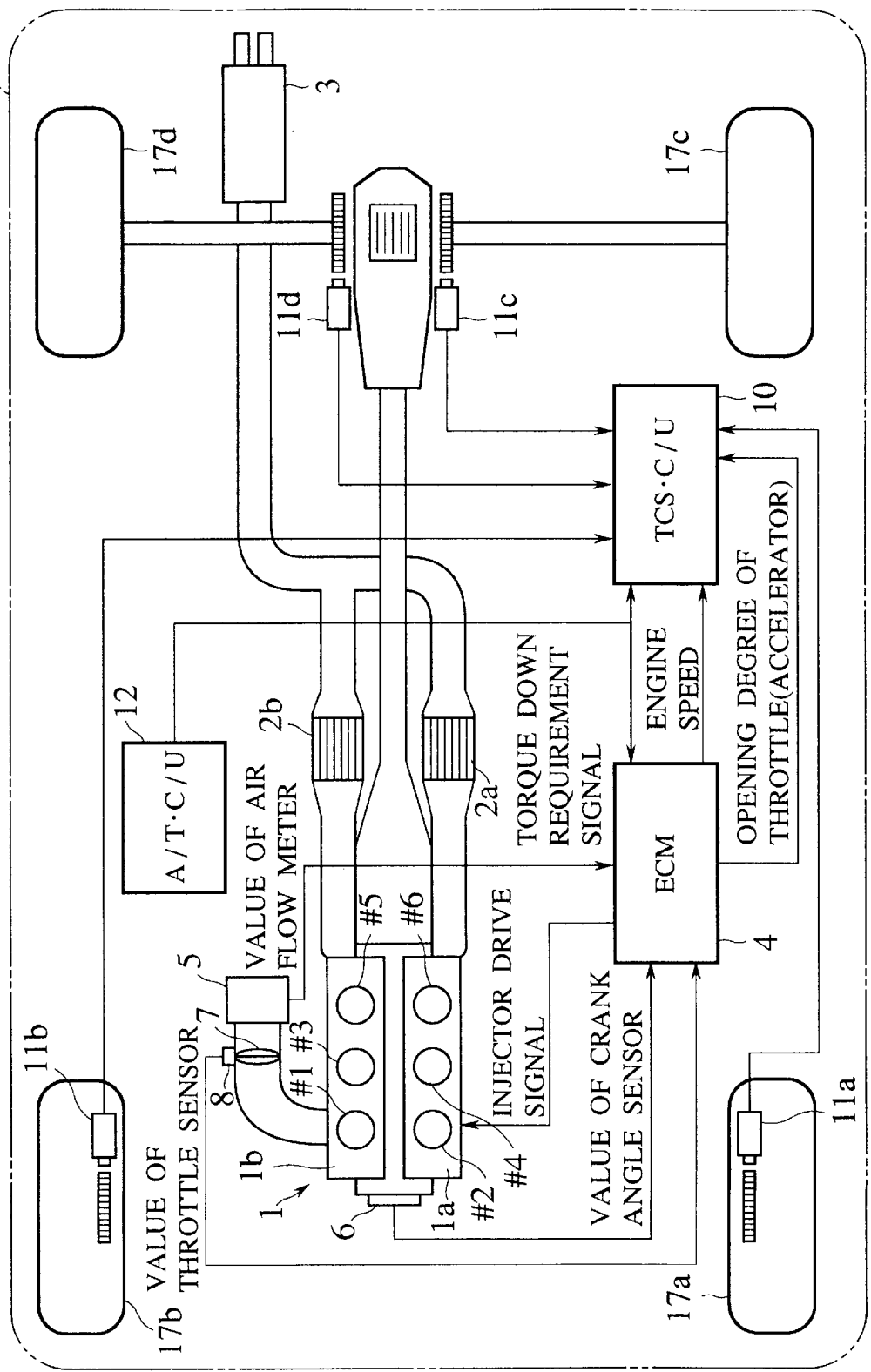
FIG. 1 is a schematic view which shows a power unit system of an automotive vehicle with a torque down control apparatus for an engine in accordance with an embodiment of the present invention.
Figure 2:
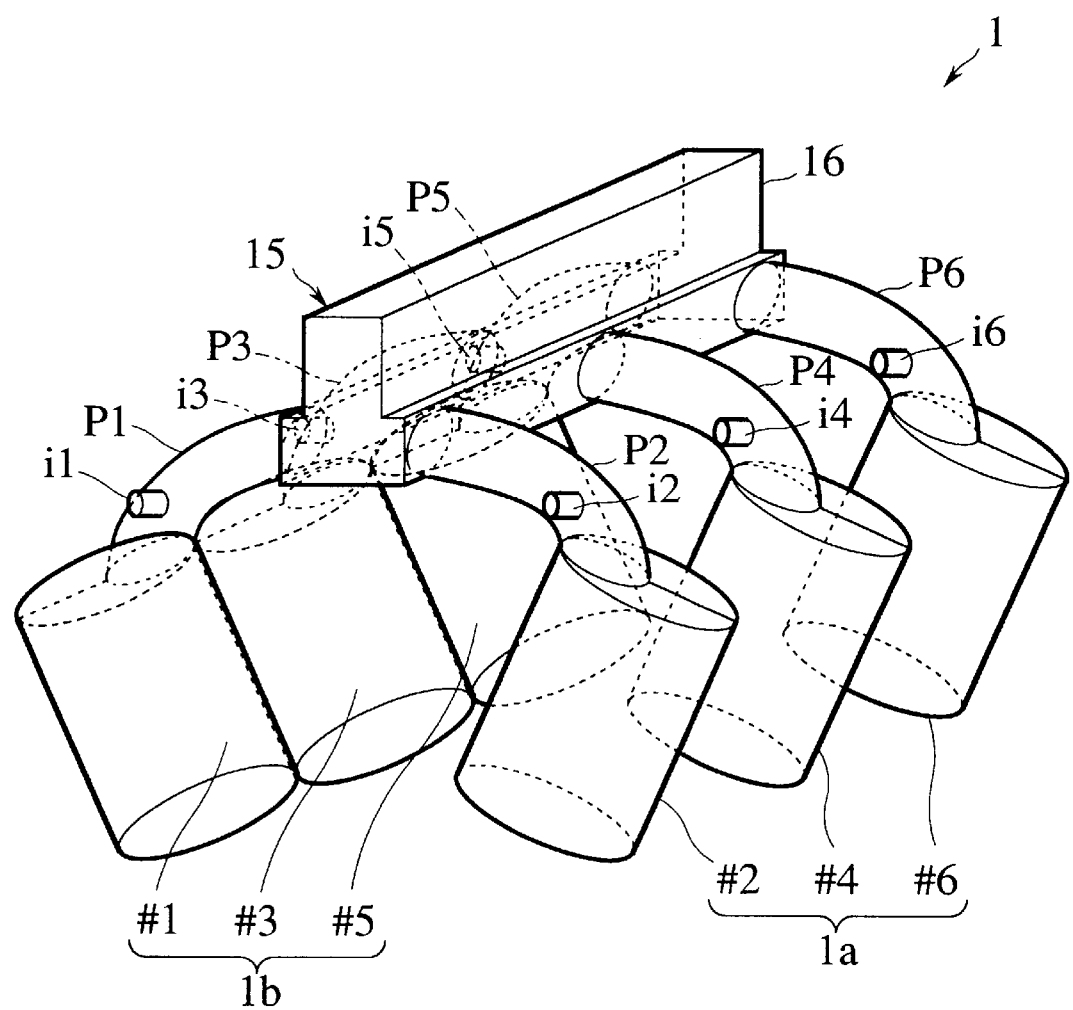
FIG. 2 is a perspective view which schematically shows a main portion of a cylinder block and a cylinder head of the engine shown in FIG. 1.
Figure 3:
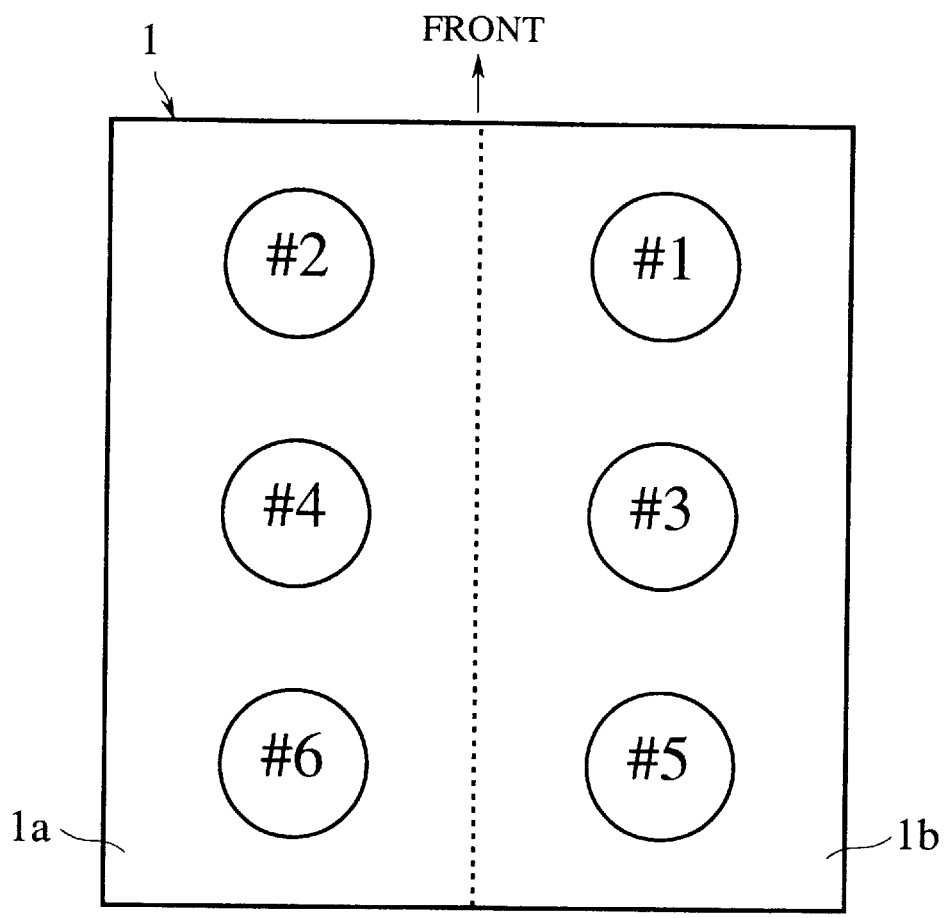
FIG. 3 is a schematic view which plainly shows an arrangement of the cylinders of the engine shown in FIG. 2.

FIG. 1 is a schematic view which shows a power unit system of an automotive vehicle 200 with a torque down control apparatus for an engine 1 in accordance with an embodiment of the present invention, FIG. 2 is a perspective view which schematically shows a main portion of a cylinder block and a cylinder head of the engine 1 and FIG. 3 is a schematic view which plainly shows an arrangement of the cylinders of the engine 1.

As shown in FIG. 2, an engine 1 is a V type six cylinder engine and is provided with a left bank 1a comprising three cylinders No. 2, No. 4 and No. 6 and with a right bank 1b comprising three cylinders No. 1, No. 3 and No. 5. An inlet manifold 15 comprises a collector 16 and six branch pipes P1 to P6 branched from the collector 16. The branch pipes P1 to P6 are respectively connected to the cylinders No. 1 to No. 6. The branch pipes P1 to P6 are respectively provided with injectors i1 to i6, from which a fuel is injected to an internal portion (an inlet port) of each of the branch pipes P1 to P6. Accordingly, the fuel is supplied within a combustion chamber of each of the cylinders No. 1 (#1) to No. 6 (#6). In this case, the injectors i1 to i6 may be structured such as to directly inject the fuel into the combustion chamber of each of the cylinders No. 1 to No. 6 other than the structure of injecting the fuel into the inlet port.

As shown in FIG. 1, a discharged air from each of the cylinders No. 1 to No. 6 is independently gathered at each of the left bank 1a and the right bank 1b, gathered in a downstream position of the right and left banks 1a and 1b after passing through a catalyst 2a for the left bank 1a and a catalyst 2b for the right bank 1b and after passing through a muffler 3, discharged to an open air.

The three cylinders No. 2, No. 4 and No. 6 of the left bank 1a constitute a first cylinder group and the three cylinders No. 1, No. 3 and No. 5 of the right bank 1b constitutes a second cylinder group (refer to FIGS. 2 and 3). The first cylinder group includes the injectors i2, i4 and i6 for respectively supplying the fuel to the cylinders No. 2, No. 4 and No. 6 and the catalyst 2a for the left bank and the second cylinder group includes the injectors i1, i3 and i5 for respectively supplying the fuel to the cylinders No. 1, No. 3 and No. 5 and the catalyst 2b for the right bank.

In this case, the structure may be made such that the exhaust emission from the right and left banks 1a and 1b is not gathered at the downstream position of the catalysts 2a and 2b but is independently discharged to an open air through exhaust ducts separately provided to each other.

The injectors i1 to i6 provided in every cylinders No. 1 to No. 6 are opened by receiving a drive signal from an engine control module (ECM) 4 having a micro computer within, whereby the fuel is supplied to the respective cylinders No. 1 to No. 6.

Detection signals from various kinds of sensors are input to the ECM 4. The ECM 4 determines a time of driving an open valve of each of the injectors i1 to i6, that is, a fuel injection amount on the basis of these detection signals.

The various kinds of sensors include an air flow meter 5 for detecting an amount of an intake air of the engine 1, a crank angle sensor 6 for detecting a crank angle of the engine 1, a throttle sensor 8 for detecting a throttle valve position TVO of a throttle valve 7 and so on.

Further, the automotive vehicle 200 in accordance with the present invention is provided with a traction control system (TCS). To a TCS control unit (TCS C/U) 10, as well as a detection signal from vehicle wheel speed sensors 11a, 11b, 11c and 11d respectively provided in four wheels 17a to 17d are input, an engine speed and an information concerning a throttle valve position are input from the ECM 4 by a communication system, such as a local area network (LAN).

The TCS control unit 10 calculates a slip rate of the drive wheel on the basis of the above various kinds of signals, determines a required amount for a torque down in correspondence to a slip state and outputs a torque down requirement signal to the ECM 4.

The ECM 4 receiving the torque down requirement signal controls each of the injectors i1 to i6 so as to temporally stop the fuel supply to a suitable number of cylinders among the cylinders No. 1 to No. 6 in correspondence to the torque down requirement amount. As mentioned above, when the temporary stop of the fuel supply (a fuel cut) to the cylinders No. 1 to No. 6 is performed, the output torque of the engine is lowered and the drive torque of the drive wheel is lowered so that generation of the slippage is prevented.

Figure 4:
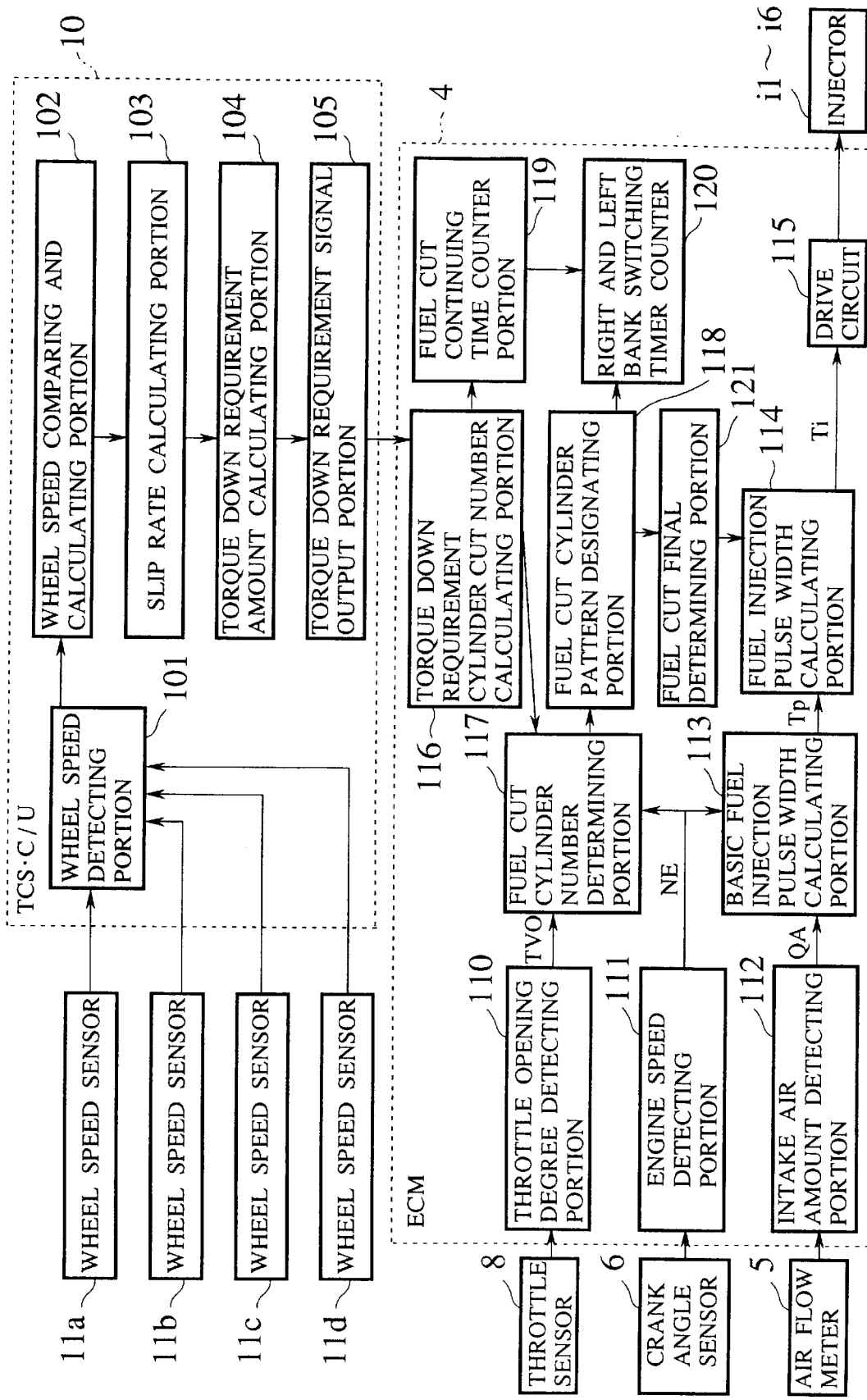
FIG. 4 is a block diagram which shows functions of a fuel injection control and a traction control of the engine shown in FIG. 1.

In the case of an automotive vehicle having an automatic transmission, there is a case that a torque down requirement signal is also output to the ECM 4 from a control unit for the automatic transmission (A/T C/U) 12 at a time of changing speed. FIG. 4 is a block diagram which shows control functions by the ECM 4 and the TCS control unit 10.

At first, a control function of the TCS control unit 10 will be explained below.

A wheel speed detecting portion 101 detects a rotation speed of each of the wheels on the basis of the signal from the wheel speed sensors 11a to 11d.

A wheel speed comparing and calculating portion 102 compares a rotation speed of a front wheel with a rotation speed of a rear wheel and a slip rate calculating portion 103 calculates a slip rate.

A torque down requirement amount calculating portion 104 calculates a torque down requirement amount on the basis of the above calculated slip rate.

A torque down requirement signal indicating the above torque down requirement amount is output to the ECM 4 from a torque down control signal output portion 105.

Next, a fuel injection control by the ECM 4 will be explained below.

At first, an engine speed detecting portion 111 detects an engine speed NE (rpm) on the basis of a signal from the crank angle sensor 6 and an intake air amount detecting portion 112 detects an intake air amount QA on the basis of a signal from the air flow meter 5.

A basic fuel injection pulse width calculating portion 113 calculates a basic pulse width Tp of the drive signal output to each of the injectors i1 to i6 on the basis of the above detected engine speed NE and the intake air amount QA.

A fuel injection pulse width calculating portion 114 adjusts the above basic pulse width Tp in correspondence to a temperature of a cooling fluid for the engine and calculates a final pulse width Ti.

Then, the drive signal of the above injection pulse width Ti is output to each of the injectors i1 to i6 from a drive circuit 115 at a timing interlocked with the engine speed.

On the contrary, the torque down requirement signal input from the torque down control signal output portion 105 of the TCS control unit 10 is input to a torque down requirement cylinder cut number calculating portion 116 of the ECM 4. The torque down requirement cylinder cut number calculating portion 116 calculates a number of cylinders in which the fuel cut is required (a required number of cylinders) in correspondence to a torque down requirement signal (a torque down requirement amount).

The above calculated required number of cylinders is output to a fuel cut cylinder number determining portion 117. The fuel cut cylinder number determining portion 117 determines whether or not the fuel cut is performed with respect to the same number of cylinders as that of the calculated required number of cylinders on the basis of the throttle valve position TVO input through the throttle valve position detecting portion 110 and the engine speed NE input through the engine speed detecting portion 111. In the case that it is determined that the fuel cut is not performed with respect to the same number of cylinders as that of the above calculated required number of cylinders, the required number of cylinders is determined to be suitable and is output to a fuel cut cylinder pattern designating portion 118.

Further, in the case that it is determined that the fuel cut is not performed with respect to the same number of cylinders as that of the calculated required number of cylinders (in the case that the calculated required number of cylinders is determined to be insufficient), the structure may be made such that, for example, the fuel cut cylinder number determining portion 117 adjusts to increase or decrease the above calculated required number of cylinders on the basis of the throttle valve position TVO and the engine speed NE so that the suitable required number of cylinders is determined. In this case, the adjusted required number of cylinders is output to the fuel cut cylinder pattern designating portion 118.

The fuel cut cylinder pattern designating portion 118 designates a combination (a pattern) of the cylinders in which the fuel is cut in the case that the fuel cut is performed with respect to the cylinders of the above determined required number of cylinders. In accordance with the present embodiment, the fuel cut cylinder pattern designating portion 118 stores previously set switching patterns of the combinations of cylinders in which the fuel is cut at every required number of cylinders, and the pattern corresponding to the above determined required number of cylinders is designated among these stored patterns.

In this case, the cylinder in which the fuel is cut is designated such as to, when a continuing time of the fuel cut counted in a fuel cut continuing time counting portion 119 is within a predetermined allowable time, be switched between the right and left banks 1a and 1b at every time counted by a right and left pattern switching timer counter 120, by the fuel cut cylinder pattern designating portion 118. Further, in the case that the continuing time of the fuel cut is over the above allowable time, that is, the fuel cut is continuously performed for a significantly long time, since there is a risk that the temperature increase of the catalyst 2a and 2b can not be restricted by switching the cylinder in which the fuel is cut, the fuel cut is temporarily interrupted. In the meantime, the switching control between the right and left banks 1a and 1b will be explained after in detail.

The fuel cut final determining portion 121 finally determines whether or not the fuel cut should be performed on the basis of results of a trouble determination and the like which are separately performed. When it is the condition where the fuel cut is performed, the cylinder designated by the above fuel cut cylinder pattern designating portion 118 is output to the fuel injection pulse width calculating portion 114. The fuel injection pulse width calculating portion 114 sets the injection pulse width Ti of the drive signal to the corresponding injector to zero so that the fuel injection amount of the above designated cylinder becomes zero.

Next, the switching control of the cylinder in which the fuel is cut between the right and left banks 1a and 1b will be explained in detail with reference to FIG. 5. FIG. 5 is a view which shows cylinder patterns for the fuel cut in accordance with a first embodiment of the present invention.

In the switching pattern stored in the fuel cut cylinder pattern designating portion 118, as shown in FIG. 5, an A mode and a B mode are set at every required number of cylinders. The fuel cut cylinder pattern designating portion 118 switches the A mode and the B mode corresponding to the required number of cylinders determined by the fuel cut cylinder number determining portion 117 at every predetermined time period.

Concretely speaking, when the required number of cylinders determined by the fuel cut cylinder number determining portion 117 is one, after the fuel cut of the cylinder No. 1 in the right bank 1b is performed for a predetermined time, the fuel cut of the cylinder No. 2 in the left bank 1a is performed for a predetermined time and thereafter again the fuel cut of the cylinder No. 1 is repeatedly performed by switching so that the fuel cut of the cylinder No. 1 in the right bank 1b and the fuel cut of the cylinder No. 2 in the left bank 1a are alternately performed.

When the required number of cylinders is two, the fuel cut of the cylinder No. 1 and the cylinder No. 3 in the right bank 1b and the fuel cut of the cylinder No. 2 and the cylinder No. 4 in the left bank 1a are alternately performed at every predetermined time.

When the required number of cylinders is three, the fuel cut of all of the three cylinders No. 1, No. 3 and No. 5 in the right bank 1b and the fuel cut of all the three cylinders No. 2, No. 4 and No. 6 in the left bank 1a are alternately performed at every predetermined time.

When the required number of cylinders is four, the fuel cut of all the three cylinders No. 1, No. 3 and No. 5 in the right bank 1b and the cylinder No. 2 in the left bank 1a and the fuel cut of all the cylinders No. 2, No. 4 and No. 6 in the left bank 1a and the cylinder No. 1 in the right bank 1a are alternately performed at every predetermined time.

When the required number of cylinders is five, the fuel cut of all the three cylinders No. 1, No. 3 and No. 5 in the right bank 1b and the cylinders No. 4 and No. 6 in the left bank 1a and the fuel cut of all the cylinders No. 2, No. 4 and No. 6 in the left bank 1a and the cylinders No. 3 and No. 5 in the right bank 1a are alternately performed at every predetermined time.

When the required number of cylinders is six, the fuel cut of all the six cylinders is continuously performed.

In this case, if the switching time (the above predetermined time) of the cylinder in which the fuel is cut, since the fuel cut is continuously performed in the same bank 1a or 1b (the same cylinder group) for a long time, there is a possibility that the temperature of the catalyst 2a or 2b included in the cylinder group in which the fuel cut is performed is greatly increased. On the contrary, if the above predetermined time is short, there is a possibility that the temperature of the catalyst 2a or 2b included in the cylinder group in which the fuel cut is not performed is not sufficiently decreased. Accordingly, it is necessary to set the above predetermined time to a time which is longer than the time that the temperature of the catalyst 2a or 2b of the cylinder group in which the fuel cut is not performed is sufficiently reduced and shorter than the time that the temperature increase of the catalyst 2a or 2b of the cylinder group in which the fuel cut is performed reaches the limitation. The above predetermined time of the present invention is set to 0.3 to 0.5 second as a result of an experiment.

As mentioned above, the present embodiment is structured such that the combination of cylinders in which the fuel cut is performed is switched between the right and left banks 1a and 1b in accordance with the preset patterns. Accordingly, it is avoided that the fuel cut is continuously performed only in the one bank and the after burning due to the fuel cut is not continuously generated only in the one bank so that the concentration of the thermal damage to the one catalyst can be prevented.

In order to reduce the thermal damage against the catalyst, it is preferable to structure such that a state where the fuel cut is not performed periodically occurs. For example, in the case that the required number of cylinders is three, it is possible that the fuel cut of two cylinders is performed in the one bank and the fuel cut of one cylinder is performed in the other bank. However, in such a fuel cut, both the bank 1a and 1b are in a state that the fuel cut is always performed so that a phenomenon that an air discharged from the cylinder is burnt in the exhaust manifold and/or the exhaust pipe (the after burning) is continuously generated. In contrast of this, in the above structure in which the fuel cut is not performed in the other bank during the fuel cut of three cylinders is performed in the one bank, the after burning intermittently occurs in both of the banks. Accordingly, in comparison with the above case in which the after burning is continuously generated, the increase of the catalyst can be prevented.

Further, in the case that the required number of cylinders is four or five, it is preferable to structure such that a state where the number of cylinders in which the fuel cut is performed becomes the minimum periodically occurs in the one and the other banks, for example, as mentioned above, the fuel cut state of all the three cylinders and the fuel cut state of one or two cylinders are alternately given.

Figure 6:
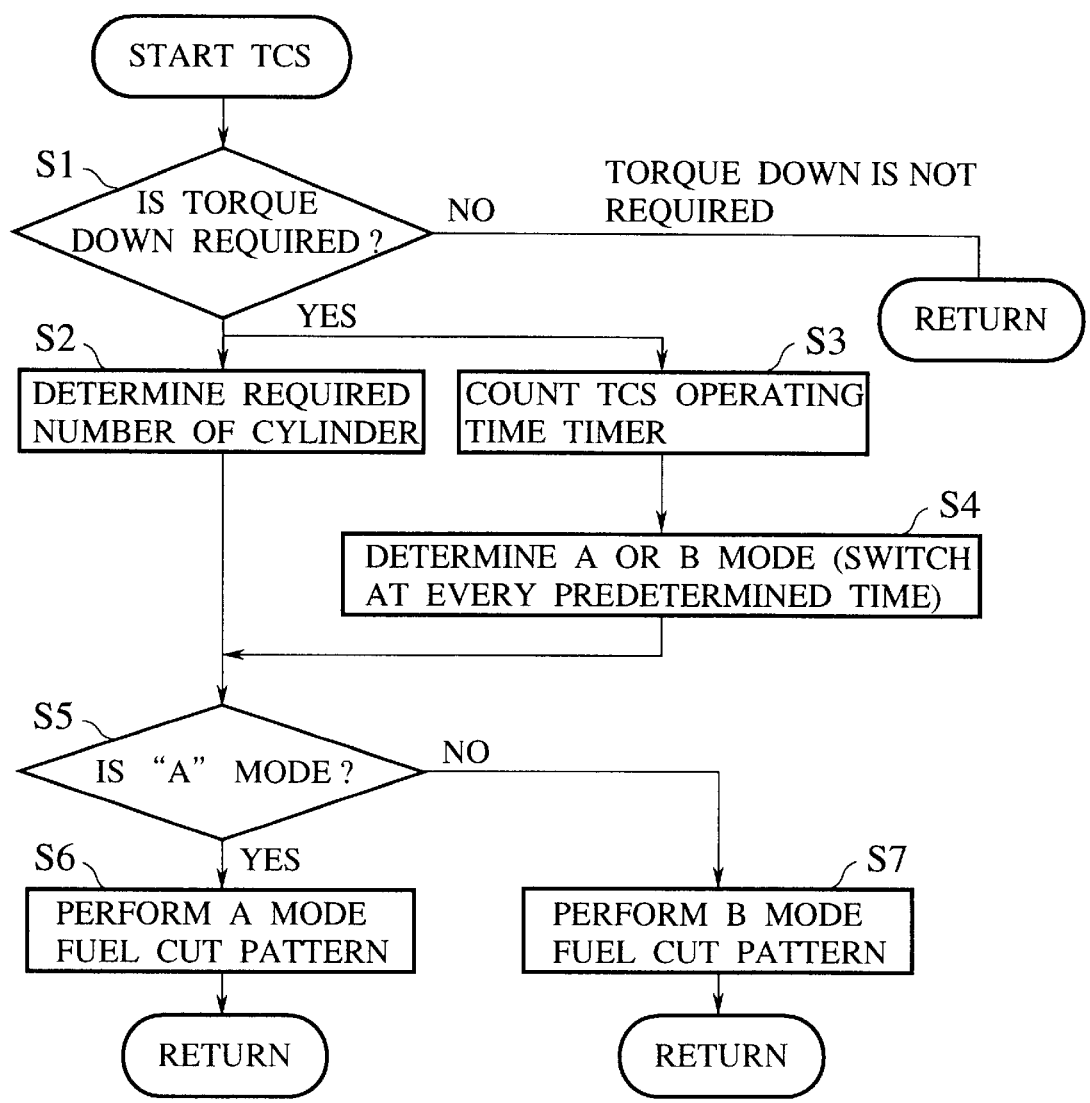
FIG. 6 is a flow chart which shows a switching control of a fuel cut cylinder pattern in accordance with a first embodiment of the present invention.

A flow chart of FIG. 6 shows the switching control between the right and left banks 1a and 1b of the engine 1 in which the fuel cut is performed in accordance with the present invention. At first, in a step S1, whether or not the torque down requirement signal is output from the TCS control unit 10 (whether or not the TCS requires the torque down) is determined by the TCS torque down required cylinder cut number calculating portion 116.

When the torque down requirement signal is output, the step goes forward to a step S2 and a step S3. In the step S2, the required number of cylinders of the fuel cut is calculated by the torque down required cylinder cut number calculating portion 116.

In this case, the flow chart shows the case that the required number of cylinders calculated by the torque down required cylinder cut number calculating portion 116 is determined to be appropriate by the fuel cut cylinder number determining portion 117. Accordingly, in the case that the required number of cylinders calculated by the fuel cut cylinder number determining portion 117 is determined to be inappropriate, in place of the above calculated required number of cylinders, the required number of cylinders adjusted in such a manner as the above embodiment is used in the following control.

In the step S3, a counting of a continuing time of the fuel cut is started by the fuel cut continuing time counter portion 119.

In a step S4, a counting of a switching time is started by the right and left pattern switching timer counter 120. When the fuel cut continuing time counted by the fuel cut continuing time counter portion 119 is within the predetermined allowable time, the switching between the A and B modes are performed by the fuel cut cylinder pattern designating portion 118 at every predetermined time.

These A and B modes mean, as shown in FIG. 5, that one of the fuel cut switching patterns in accordance with the cut required number is defined as the A mode and the other is defined as the B mode, for example, when the required number of cylinders is one, a mode for performing the fuel cut of the cylinder No. 1 in the right bank 1b is the A mode and a mode for performing the fuel cut of the cylinder No. 2 in the left bank 1a is the B mode.

In this case, the starting time for counting the fuel cut continuing time means a starting time for outputting the torque down requirement signal. Accordingly, if the contents of the signal is changed during the output of this requirement signal (if the torque down requirement amount is changed), the time already counted is not reset so that the time from the time before the change is counted.

In a step S5, whether or not the A mode is on the way to setting is determined and at a time of the A mode, the step goes forward to a step S6 in which the fuel cut is performed in accordance with the pattern of the A mode determined at every required cylinder. Further, when the A mode is not on the way to setting, that is, when the B mode is on the way to setting, the step goes forward to a step S7 in which the fuel cut is performed in accordance with the pattern of the B mode determined at every required cylinder. After the step S6 or S7 is performed, the process returns to the step S1.

When "NO" is obtained at the step S1, i.e., the torque down is not required, it returns to the step S1. Here, the fuel cut time counter portion 119 can be reset.

In the above flow chart, a final determination whether or not the fuel cut should be performed in the fuel cut final determining portion 121 is omitted. Accordingly, in the case that the fuel cut final determining portion 121 determines that the fuel cut should not be performed, in the step S5, the fuel cut is not performed.

As mentioned above, since the present invention is structured such that a total reduction amount of the fuel supply in each of the banks changes with the passage of time, a large amount of fuel cut is not performed in the same bank. Accordingly, an influence to the catalyst due to the fuel cut is not concentrated to the one of the banks and is separated into both of the catalysts 2a and 2b in the right and left banks 1a and 1b. Accordingly, the thermal deterioration of the catalysts 2a and 2b can be prevented.

Further, since it is structured that the cylinder in which the fuel is cut is successively switched in accordance with the switching pattern of the combination of cylinders previously set in correspondence to the required number of cylinders, the switching of the cylinder in which the fuel supply is cut is appropriately performed and the stability of the fuel cut can be achieved.

Still further, it is structured that the state where the number of cylinders in which the minimum cut is performed becomes the minimum periodically occurs in the one and the other banks, the cylinder in which the fuel is cut is concentrated to the one bank as much as possible and the bank to which the fuel cut is concentrated is successively switched. Accordingly, since the state where the influence of the fuel cut becomes the minimum alternately occurs in both of the banks, the temperature increase of catalyst can be prevented at the maximum degree.

Furthermore, in the case that the required number of cylinders of the fuel cut changes during a fuel cut, it is preferable that the number of cylinders in which the fuel cut is performed is immediately increased or decreased in correspondence to the change of the required number of cylinders for securing a responsibility of the torque control. In contrast with this, the next switching after increased or decreased in correspondence to the change of the required number of cylinders is preferably performed after the predetermined time lapse continuously calculated from a time before the change of the required number of cylinders in place of being performed after the predetermined time lapse from a time of change of the required number of cylinders. Because if the switching time is newly measured from the time when the required number of cylinders is changed, the continuing time of the fuel cut in the one bank becomes long as a result and the thermal damage against the one catalyst becomes the same level as that in the case that the fuel cut is continuously performed with respect to the special cylinder without switching the cylinder so that there is a risk that the effect of the present embodiment that the thermal damage against the catalyst is reduced by switching the cylinder in which the fuel cut is performed can not sufficiently obtained.

As to this point, the present embodiment is structured, as mentioned in the above, such that the number of cylinders in which the fuel cut is performed is immediately changed at a time of changing the required number of cylinders and that the switching time between the right and left banks is continuously calculated from the time before the required number of cylinders is changed. Concretely speaking, for example, in the case that the cylinder in which the fuel cut is performed is switched between the right and left banks 1a and 1b at every 0.5 second, when the required number of cylinders is increased from one to two at a time that 0.2 second lapses after switching, the number of cylinders in which the fuel is cut is immediately increased from one to two and the next switching is performed after 0.3 second lapses from the time of increasing the required number of cylinders, that is, at a time when the right and left banks 1a and 1b are expected to be switched if the fuel cut in one cylinder is continued, so that the fuel cut state is switched to the fuel cut state of two cylinders in the other bank.

Accordingly, the responsibility with respect to the change of requirement for the torque down can be improved. Further, since the time of switching the cylinder in which the fuel cut is performed is not temporarily delayed, it can be prevented that a time by which the fuel cut affects one catalyst becomes unnecessarily long.

Next, a second embodiment of the present invention will be explained below with reference to a flow chart shown in FIG. 7 and a fuel cut cylinder pattern (a phase mode) shown in FIG. 8.

The present embodiment is structured such that in the case that the number of cylinders given to each of the banks among the required number of cylinders is smaller than the total number of cylinders included in the bank, the combination of cylinders in which the fuel cut is performed is changed in each of the bank at every time when the cylinder in which the fuel cut is performed is switched during the required number of cylinders is not changed. Accordingly, the present embodiment is different from the first embodiment in view of the switching pattern for the fuel cut previously set and the other structure is the same as that of the first embodiment so that the detailed explanation thereof will be omitted.

The fuel cut switching pattern in accordance with the present embodiment is set as a phase mode in correspondence to the required number of cylinders as shown in FIG. 8. This phase mode is set as 1 to 6 and is switched as 1→2→3→4→5→6→1→. . . in the order.

Concretely speaking, the phase mode in correspondence to the required number of cylinders one for the fuel cut is set such that the cylinder in which the fuel cut is performed is successively switched between the right and left banks 1a and 1b as in the order of No. 1 cylinder (the right bank 1b)→No. 2 cylinder (the left bank 1a)→No. 3 cylinder (the right bank 1b) →No. 4 cylinder (the left bank 1a)→No. 5 cylinder (the right bank 1b)→No. 6 cylinder (the left bank 1a)→No. 1 cylinder (the right bank 1b) and is also successively switched in the same bank.

The phase mode in correspondence to the required number of cylinders two is set such that the fuel cut by the three combinations of cylinders in the right bank 1b (the combinations of No. 1 and No. 3 cylinders, of No. 3 and No. 5 cylinders and of No. 1 and No. 5 cylinders) and the fuel cut by the three combinations of cylinders in the left bank 1a (the combinations of No. 2 and No. 4 cylinders, of No. 4 and No. 6 cylinders and of No. 2 and No. 6 cylinders) is successively and alternately performed.

The phase mode in correspondence to the required number of cylinders four or five is set such that the fuel cut of all the cylinders in the one bank is performed and the fuel cut of one cylinder or two cylinders in the other bank is performed and the combination of the fuel cut of one cylinder or two cylinders is successively and alternately changed in the same bank as in the same manner in the case that the required number of cylinders is one cylinder or two cylinders mentioned above.

Figure 7:
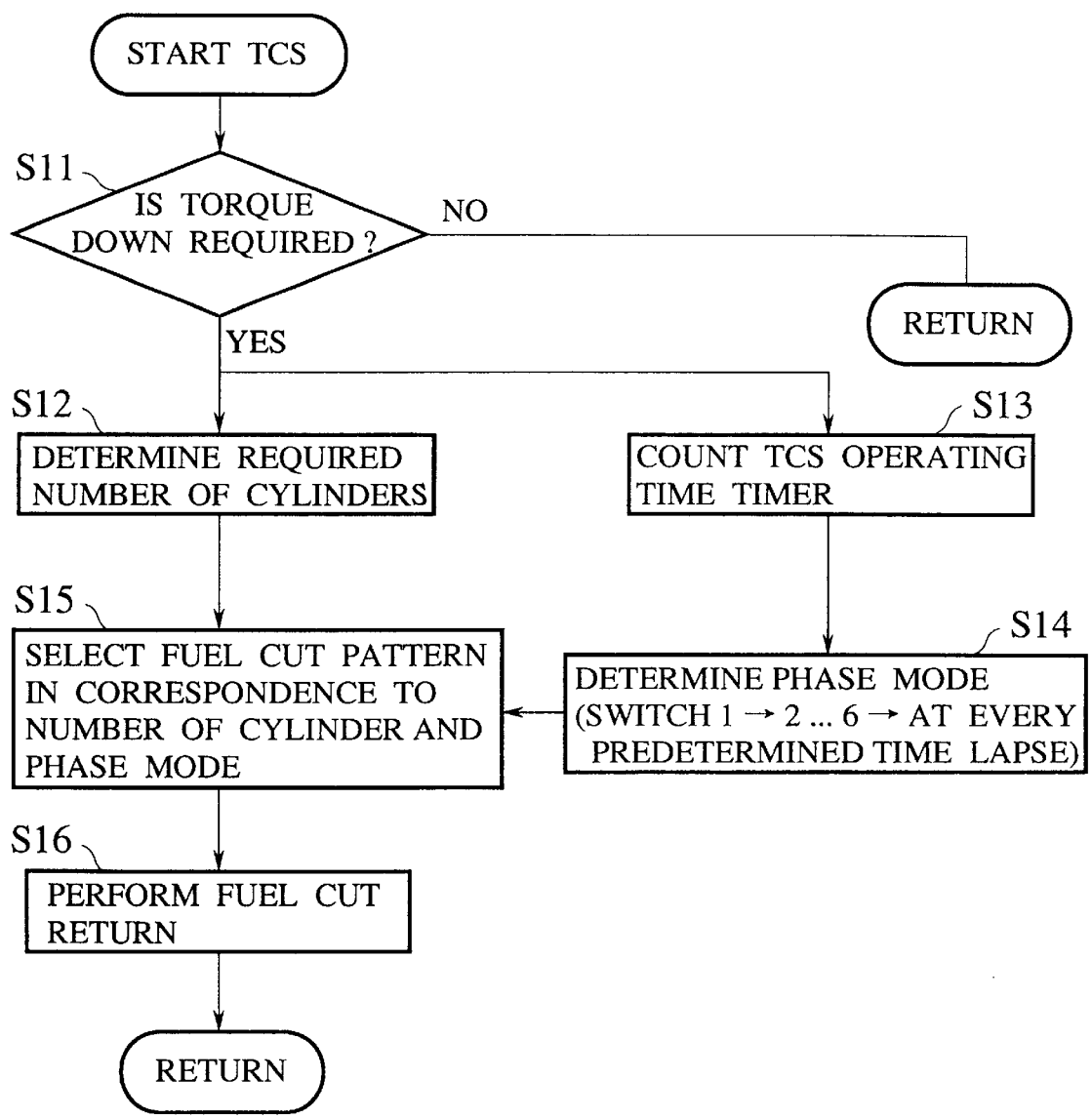
FIG. 7 is a flow chart which shows a switching control of a fuel cut cylinder pattern in accordance with a second embodiment of the present invention.

A flow chart of FIG. 7 shows the switching control between the right and left banks 1a and 1b of the cylinder in which the fuel cut is performed in accordance with the present invention. Since steps S11, S12 and S13 respectively correspond to the steps S1, S2 and S3 in the first embodiment, the detailed explanation of each of the steps will be omitted.

Accordingly, in a step S11, whether or not the torque down requirement signal is output from the TCS control unit 10 is determined and when the torque down requirement signal is output, the step goes forward to a step S12 and a step S13. In the step S12, the required number of cylinders of the fuel cut is calculated and determined. While in the step S13, a counting of a continuing time of the fuel cut is started and the step goes forward to the step S14.

In the step S14, when the continuing time of the fuel cut is within the predetermined allowable time, the phase mode (refer to FIG. 8) is successively switched by the fuel cut cylinder pattern designating portion 118 (refer to FIG. 4) at every predetermined time counted by the right and left pattern switching timer counter 120 (refer to FIG. 4).

In a step S15, the cylinder in which the fuel cut is performed is designated on the basis of the required number of cylinders determined in the step S12 and the phase mode determined in the step S14. For example, when the required number of cylinders is two and the phase mode is 3, the cylinders No. 3 and No. 5 are designated as the cylinder in which the fuel cut is performed.

In a step S16, the fuel cut of the cylinder designated in the step S15 is performed.

In accordance with the present embodiment, the fuel cut is not performed only in the partially special cylinder in the same bank so that the influence due to the fuel cut (a change of temperature, a change of a wall flow in a port injection and the like) can be unified between the cylinders.

Next, a third embodiment of the present invention will be explained below with reference to a flow chart shown in FIG. 9.

The present embodiment is structured such that a time for switching the cylinder in which the fuel cut is performed in the right and left banks 1a and 1b (hereinafter, refer to a switching time) is not a constant value such as in the first and second embodiments but is a variable value in response to the engine load and the engine speed. Accordingly, the present embodiment is different from the first and second embodiments in view of the switching time, that is, the switching time is constant or variable, and the other structure thereof is the same as that of the first and second embodiment so that the detailed explanation will be omitted.

The ECM of the present embodiment is further provided with a map (refer to FIG. 9) for selecting the switching time. On this map, the switching time is set between 0.3 second and 0.5 second in such a manner as to uniformly correspond to the engine speed NE and the throttle valve position TVO as the engine load. The map is set such that the switching time becomes shorter when the engine speed NE is increased and that the switching time becomes shorter when the throttle valve position TVO is increased. The throttle valve position TVO is output from the throttle valve position detecting portion 110 (refer to FIG. 4) continuously and the engine speed NE is output from the engine speed detecting portion 111 (refer to FIG. 4) continuously. For example, when the throttle valve position TVO is 3/16 and the engine speed NE is 3000 rpm, the switching time is selected as 0.4 second.

The switching control in the case that the third embodiment is applied to the first embodiment will be explained below with reference to a flow chart formed by adding a step S21 shown in FIG. 9 between the step S3 and the step S4 of the flow chart in the first embodiment shown in FIG. 6.

Figure 9:
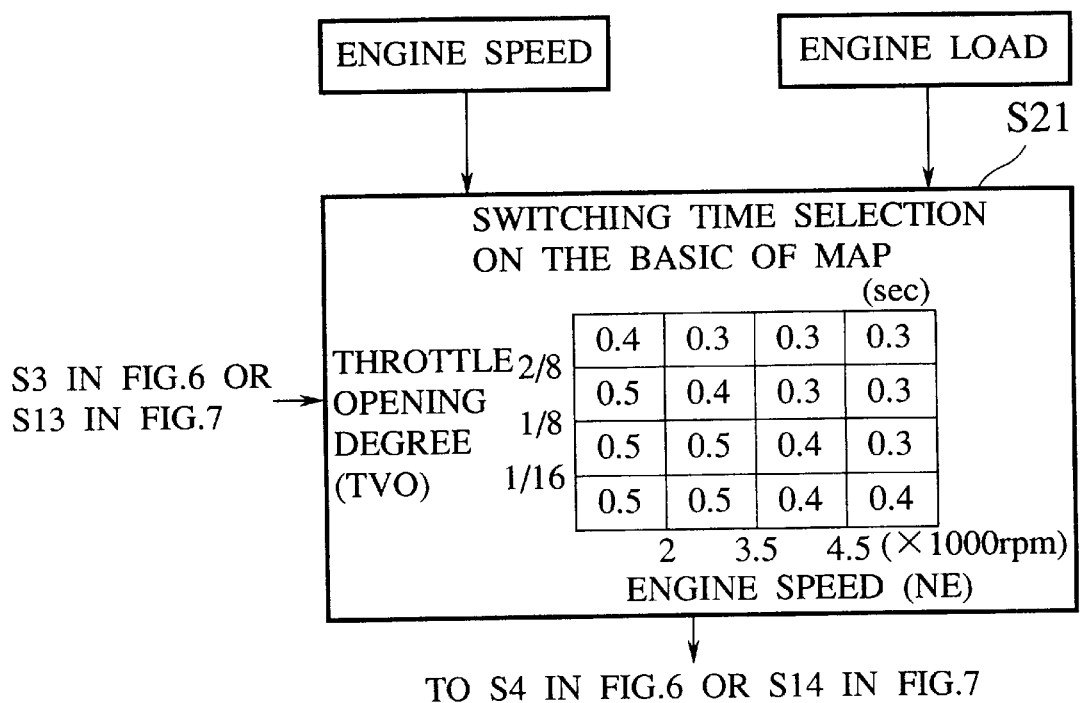
FIG. 9 is a view which shows a selection control of a switching time in accordance with a third embodiment of the present invention.

When counting of the continuing time for the fuel cut is started in the step S3 shown in FIG. 6, the step goes forward to the step S21 of FIG. 9.

In the step S21, the switching time is selected from the map on the basis of the engine speed NE and the throttle valve position TVO input in the above manner and the step goes forward to the step S4.

In the step S4, when the continuing time of the fuel cut is within the predetermined allowable time, the A mode and the B mode are switched to each other at every switching time selected in the above manner and the step goes forward to the step S5.

Further, the switching control of the third embodiment which is applied to the second embodiment will be explained below with reference to the flow chart formed by adding the step S21 shown in FIG. 9 between the steps S13 and S14 of the flow chart of the second embodiment shown in FIG. 7.

When counting of the continuing time for the fuel cut is started in the step S13 shown in FIG. 7, the step goes forward to the step S21 of FIG. 9.

In the step S21, the switching time is selected from the map on the basis of the engine speed NE and the throttle valve position TVO input in the above manner and the step goes forward to the step S14.

In the step S14, when the continuing time of the fuel cut is within the predetermined allowable time, the phase mode is successively switched at every switching time selected in the above manner and the step goes forward to the step S15.

As mentioned above, in accordance with the present embodiment, the switching time is selected in correspondence to the change of the engine load and the engine speed, even if the temperature increasing characteristic of the catalyst due to the fuel cut is changed by the change of the engine load and the engine speed, the influence thereof can be reduced to the utmost. Accordingly, while achieving the desired torque down, the temperature increase of the catalyst can be securely prevented with no relation to the drive condition.

Next, a fourth embodiment of the present invention will be explained with reference to a flow chart shown in FIG. 10.

The present embodiment is different from the first to third embodiments in view of the structure in which the cylinder switching is performed such that the cylinder in which the fuel cut is performed in the right and left banks $1a$ and $1b$ is switched at every time when the engine is operated for a predetermined cycle, that is, an accumulated cycle of the engine becomes over a predetermined value, and the other structure thereof is the same as that of the first to third embodiments so that the detailed explanation thereof will be omitted.

The ECM of the present embodiment is further provided with a determining portion for determining whether or not the calculated accumulated cycle number is over the predetermined value.

In the above calculating portion, at first, a cycle number $Xn$ for ten milliseconds is calculated in accordance with the following equation (1) and the cycle number $Xn$ is successively calculated in accordance with the following equation (2) so that the accumulated cycle number $Zn$ is calculated.

$$Xn=[(6-\text{required number of cylinders in which a fuel cut is performed})/6]\times[(\text{engine speed})/(2\times 60\times 100)] \quad (1)$$

$$Zn=Zn-1+Xn(Zo=0) \quad (2)$$

In the above equation (1), engine speed/$(2\times 60\times 100)$ means a cycle number for ten milliseconds in the case that the fuel cut is not performed and (6− required number of cylinders in which a fuel cut is performed)/6 means a coefficient for calculating an actual cycle number in the six cylinder engine excluding the cylinders in which the fuel cut is performed. In this case, as the required number of cylinders in which the fuel cut is performed used in the above equation (1), the required number which is calculated in the torque down requirement cylinder cut number calculating portion 116 (refer to FIG. 4) and is determined to be appropriate by the fuel cut cylinder number determining portion 117 (refer to FIG. 4) or is adjusted such as the above embodiment is used.

Figure 10:
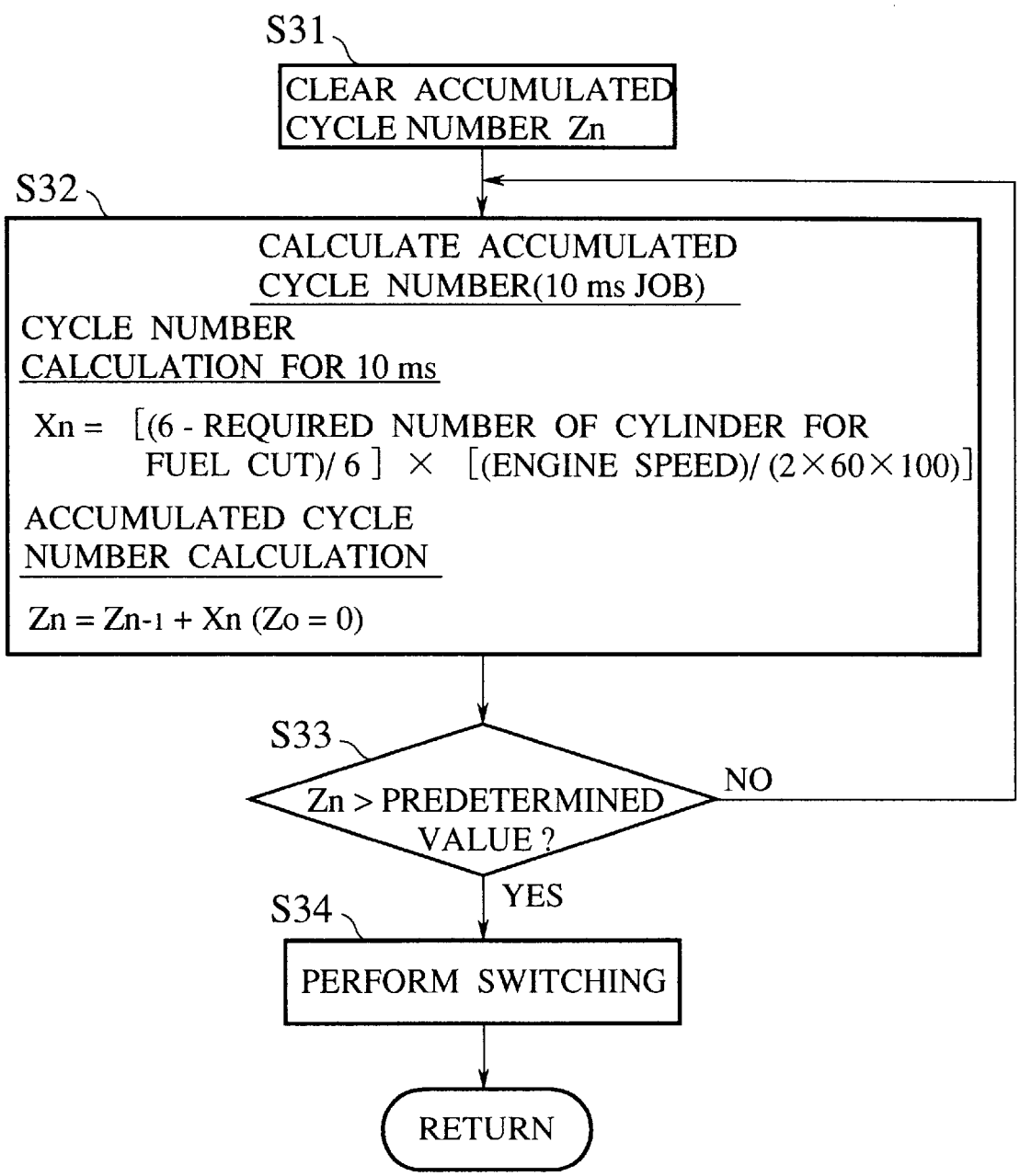
FIG. 10 is a flow chart which shows a determination control of a switching timing of a in accordance with a fourth embodiment of the present invention.

A flow chart in FIG. 10 shows a determination control of the switching timing of the present embodiment. At first, in a step S31, the stored accumulated cycle number $Zn$ is cleared and the step goes forward to a step S32.

In the step S32, the accumulated cycle number $Zn$ is calculated in accordance with the above equations (1) and (2) and the step goes forward to a step S33.

In the step S33, whether or not the accumulated cycle number $Zn$ is larger than the predetermined value is determined, and when it is determined to be larger, the step goes forward to a step S34, the switching command is output and the step goes backward to the step S31. On the contrary, when the accumulated cycle number $Zn$ is determined to be not more than the predetermined value in the step S33, the step goes forward to the step S32 and the calculation of the accumulated cycle number $Zn$ is continuously performed.

In the case that the fourth embodiment is applied to the first embodiment, the flow chart of FIG. 10 is performed for the step S4 of the flow chart in the first embodiment (refer to FIG. 6). Accordingly, when the fuel cut continuing time is within the predetermined allowable time, the switching between the A and B modes is performed at every time when the switching command is output in the step S34 of FIG. 10.

Further, when the fourth embodiment is applied to the second embodiment, the flow chart of FIG. 10 is performed between the step S13 and the step S14 of the flow chart in the second embodiment (refer to FIG. 7). Accordingly, when the fuel cut continuing time is within the predetermined allowable time, the switching of the phase mode is performed at every time when the switching command is output in the step S34 of FIG. 10.

In accordance with the present embodiment, since the switching pattern of the fuel cut is switched at every time when the exhaust is performed at a constant number, the thermal influence against each of the catalysts $1a$ and $1b$ of the right and left banks $1a$ and $1b$ can be better separated so that the prevention of the temperature increase of the catalysts $1a$ and $1b$ can be stably performed.

Next, fifth embodiment of the present invention will be explained below with reference to a flow chart shown in FIG. 11.

The present embodiment corresponds to a modified embodiment of the fourth embodiment and is structured such as to change the accumulated cycle number used in the fourth embodiment in accordance with the engine load and the engine speed.

Figure 11:
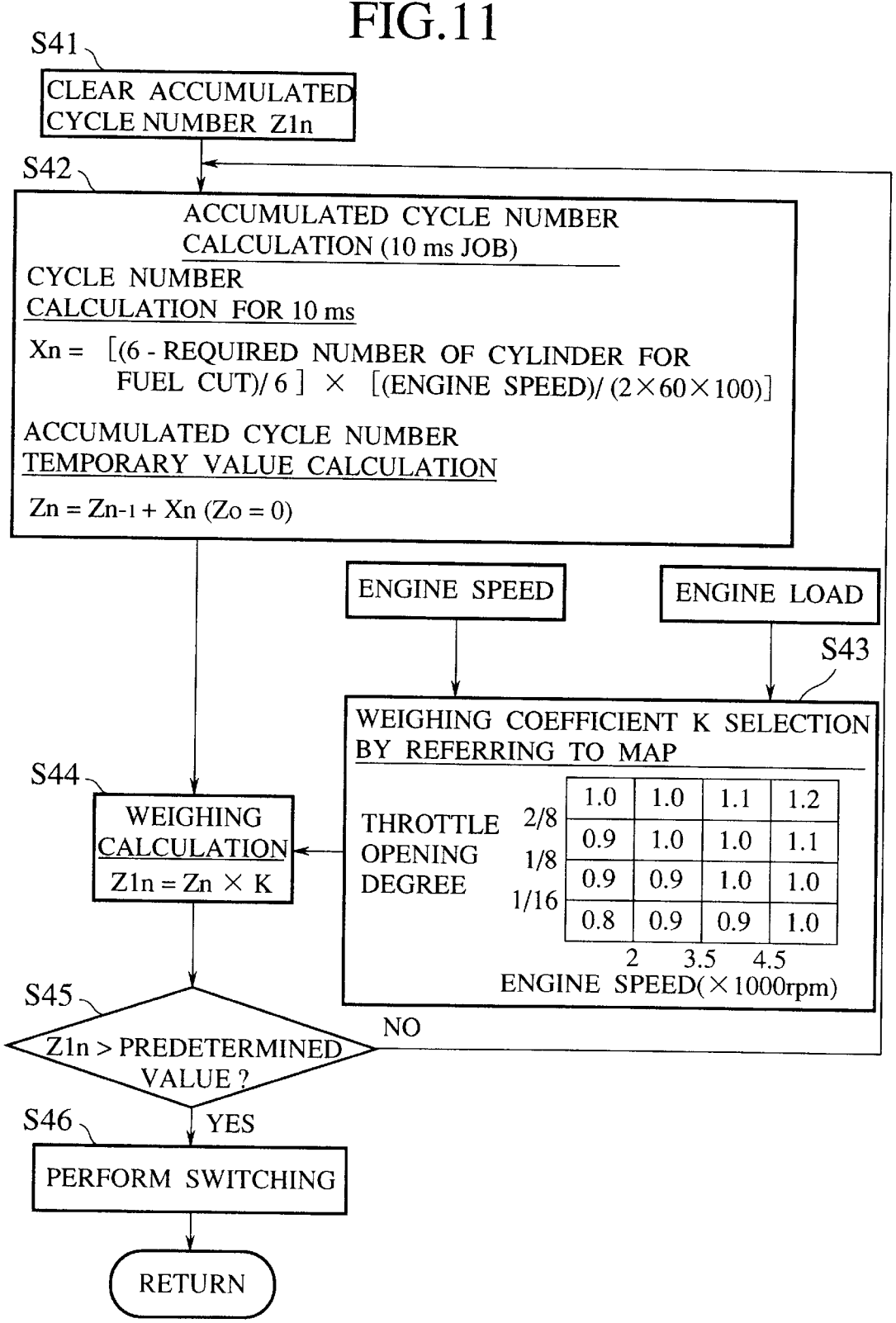
FIG. 11 is a flow chart which shows a determination control of a switching timing of a in accordance with a fifth embodiment of the present invention.

A flow chart in FIG. 11 shows a determination control of the switching timing of the present embodiment. At first, in a step S41, the stored accumulated cycle number $Z1n$ is cleared and the step goes forward to a step S42.

In the step S42, a temporary value $Zn$ of the accumulated cycle number is calculated in the same manner as in the fourth embodiment and the step goes forward to a step S43.

In the step S43, a weighting coefficient $K$ is successively selected and the step goes forward to a step S44. The weighting coefficient $K$ is selected from a preset map on the basis of the engine speed NE and the throttle valve position TVO. For example, when the throttle valve position TVO is $3/16$ and the engine speed NE is 3000 rpm, the weighting coefficient $K$ is selected as 1.0.

In the step S44, the accumulated cycle number $Z1n$ is calculated in accordance with the following equation (3) and the step goes forward to a step S45.

$$Z1n=Zn\times K \quad (3)$$

In the step S45, whether or not the accumulated cycle number $Z1n$ is more than the predetermined value is determined, and when it is determined to be larger, the step goes forward to a step S46 in which the switching command is output and the step goes backward to the step S41. On the contrary, in the case that the accumulated cycle number $Z1n$ is not more than the predetermined value in the step S45, the step goes forward to the step S42 in which the calculation of the accumulated cycle number $Z1n$ is continuously performed.

The fifth embodiment can be applied to the first and second embodiments in the same manner as the fourth embodiment. In accordance with the present embodiment, even in the case that the characteristic of the temperature increase of the catalyst due to the fuel cut is changed by the change of the engine load and the engine speed, the thermal influence against each of the catalysts $1a$ and $1b$ is better separated so that the prevention of the temperature increase of the catalysts $1a$ and $1b$ can be further stably performed.

In the third embodiment and the fifth embodiment, the throttle valve position TVO is used as the engine load, however, the present invention is not limited to this structure and, for example, the basic pulse width Tp calculated by the basic fuel injection pulse width calculating portion 113 (refer to FIG. 4) may be used as the engine load.

Further, in the above embodiments, the case of the V type six cylinder engine is shown, however, the engine may be an straight engine or a horizontal opposed engine. Still further, the number of cylinders may be eight or the like and the number of cylinder groups may be three or more.

What is claimed is:

1. A torque down control apparatus for an engine comprising:

a plurality of cylinder groups, each of the cylinder groups including cylinders, injectors respectively disposed for supplying fuel to the cylinders, and an exhaust system having a catalyst;

a controller operating one or more the injectors so as to reduce a fuel supply amount into a corresponding cylinder, said controller switching an injector to be operated so that fuel cut in each of the cylinder groups chances with time and operating the injector so that fuel injection therefrom is stopped and the fuel supply to the cylinder is cut; and a signal generating device for outputting a torque down requirement signal indicating a required torque down amount, said controller determining a number of cylinders in which a fuel cut is required on the basis of said torque down requirement signal and stopping fuel injection by operating the same number of injectors as the determined required number of cylinders, wherein said controller switches the injector to be operated, as the number of cylinders given to one cylinder group among the required number of cylinders is a predetermined number smaller than a total cylinder number included in said one cylinder group, so as to change a combination of cylinders in which the fuel cut is performed among said one cylinder group every time said predetermined number is given to said one cylinder group.

2. The torque down control apparatus as claimed in claim 1, further comprising a timer, wherein said controller switches the injector to be operated at every predetermined time period in accordance with an output signal from the timer.

3. The torque down control apparatus as claimed in claim 2, wherein said controller changes said predetermined time in response to a load of an engine and an engine speed.

4. The torque down control apparatus as claimed in claim 1, further comprising a memory, wherein a switching pattern of a combination of cylinders in which the fuel cut is performed is set in the memory at every required number of cylinders and said controller switches the injector to be operated in accordance with the switching pattern corresponding to the required number of cylinders determined on the basis of the torque down requirement signal.

5. The torque down control apparatus as claimed in claim 1, wherein said plurality of cylinder groups are two cylinder groups having the same number of cylinders, said controller operates the injectors included in one cylinder group so as to stop fuel injection when the required number of cylinders is not more than the number of the cylinder included in the cylinder group, and said controller operates all the injectors included in the one cylinder group and a number of the injectors, determined by subtracting the number of cylinders included in the one cylinder group from the fuel required number of cylinders, among the injectors included in the other cylinder group, so as to stop fuel injection when the required number of cylinders is more than the number of cylinders included in the cylinder group.

6. A torque down control apparatus for an engine as claimed in claim 5, wherein said engine comprises a V type engine having a left bank and a right bank and, said two cylinder groups comprise a first cylinder group including only the cylinders in the left bank and a second cylinder group including only the cylinders in the right bank.

7. The torque down control apparatus as claimed in claim 1, further comprising a signal generating device for outputting a torque down requirement signal indicating a required torque down amount, wherein said controller determines a number of cylinders in which the fuel cut is required on the basis of said torque down requirement signal, said controller stops the fuel injection by operating the same number of injectors as the determined required number of cylinders, and when the required number of cylinders is changed, said controller immediately operates the same number of injectors as the number of the required number of cylinders after changing of the required number of cylinders and switches the injectors to be operated after a predetermined time, continuously measured before the change of the required number of cylinders, lapses.

8. The torque down control apparatus as claimed in claim 1, wherein said controller switches the injectors to be operated when an accumulated cycle number of the engine reaches a predetermined number.

9. A torque down control apparatus for an engine as claimed in claim 1, wherein said signal generating device determines the required torque down amount in response to a slip rate of a drive wheel of an automotive vehicle.

* * * * *